US 9,887,045 B2

(12) United States Patent
Kubo et al.

(10) Patent No.: US 9,887,045 B2
(45) Date of Patent: Feb. 6, 2018

(54) POWER STORAGE DEVICE AND MANUFACTURING METHOD THEREOF

(71) Applicant: Panasonic Intellectual Property Management Co., Ltd., Osaka (JP)

(72) Inventors: Daisuke Kubo, Osaka (JP); Masayuki Takahashi, Kyoto (JP); Yukihiro Shimasaki, Hyogo (JP); Tomoyuki Tashiro, Yamaguchi (JP); Tatsuji Aoyama, Yamaguchi (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/256,737

(22) Filed: Sep. 6, 2016

(65) Prior Publication Data
US 2016/0372273 A1  Dec. 22, 2016

Related U.S. Application Data

(63) Continuation of application No. PCT/JP2015/001609, filed on Mar. 23, 2015.

(30) Foreign Application Priority Data

Mar. 28, 2014 (JP) ................................. 2014-068175

(51) Int. Cl.
*H01G 9/028* (2006.01)
*H01G 4/02* (2006.01)
(Continued)

(52) U.S. Cl.
CPC .............. *H01G 11/24* (2013.01); *H01G 9/02* (2013.01); *H01G 9/028* (2013.01); *H01G 9/035* (2013.01);
(Continued)

(58) Field of Classification Search
CPC ............. H01G 9/028; H01G 9/02; H01G 9/00
See application file for complete search history.

(56) References Cited

U.S. PATENT DOCUMENTS 4,656,560 A * 4/1987 Ito ......................... H01G 9/028
                                                         252/62.2
7,158,367 B2 * 1/2007 Fujimoto ................. H01G 9/04
                                                         361/528
(Continued)

FOREIGN PATENT DOCUMENTS

EP  2056275 A1 * 10/2012
JP  7-192536      7/1995
(Continued)

OTHER PUBLICATIONS

International Search Report of PCT application No. PCT/JP2015/001609 dated Jun. 9, 2015.

*Primary Examiner* — Eric Thomas
(74) *Attorney, Agent, or Firm* — McDermott Will & Emery LLP

(57) ABSTRACT

A power storage device has a power storage element and an electrolytic solution. The power storage element includes an anode body, a cathode body opposed to the anode body, and a separator interposed between the anode body and the cathode body. The separator includes a separator base material and a conductive polymer deposited on the separator base material. The power storage element is impregnated with the electrolytic solution. The separator has a first surface layer, which includes a first surface opposed to the anode body, and a second surface layer, which includes a second surface opposed to the cathode body. The first surface layer has a first region in which the conductive polymer is deposited, and the second surface layer has a second region in which the conductive polymer is not deposited.

17 Claims, 12 Drawing Sheets

(51) Int. Cl.
  *H01G 9/00* (2006.01)
  *H01G 11/24* (2013.01)
  *H01G 9/02* (2006.01)
  *H01G 9/035* (2006.01)
  *H01G 9/15* (2006.01)
  *H01G 11/52* (2013.01)
  *H01G 11/58* (2013.01)
  *H01G 13/04* (2006.01)

(52) U.S. Cl.
  CPC ............. *H01G 9/151* (2013.01); *H01G 11/52* (2013.01); *H01G 11/58* (2013.01); *H01G 13/04* (2013.01)

(56) References Cited

U.S. PATENT DOCUMENTS

| | | | |
|---|---|---|---|
| 8,767,377 B2* | 7/2014 | Aoyama | H01G 9/02 361/502 |
| 2013/0059064 A1 | 3/2013 | Majima et al. | |
| 2016/0012973 A1* | 1/2016 | Takatani | H01G 9/0036 361/528 |

FOREIGN PATENT DOCUMENTS

| | | | |
|---|---|---|---|
| JP | 7-283086 | | 10/1995 |
| JP | 2000106330 A | * | 4/2000 |
| JP | 2005-347600 | | 12/2005 |
| JP | 2010177498 A | * | 8/2010 |
| JP | 2013-058807 | | 3/2013 |
| JP | 2013-191780 | | 9/2013 |

* cited by examiner

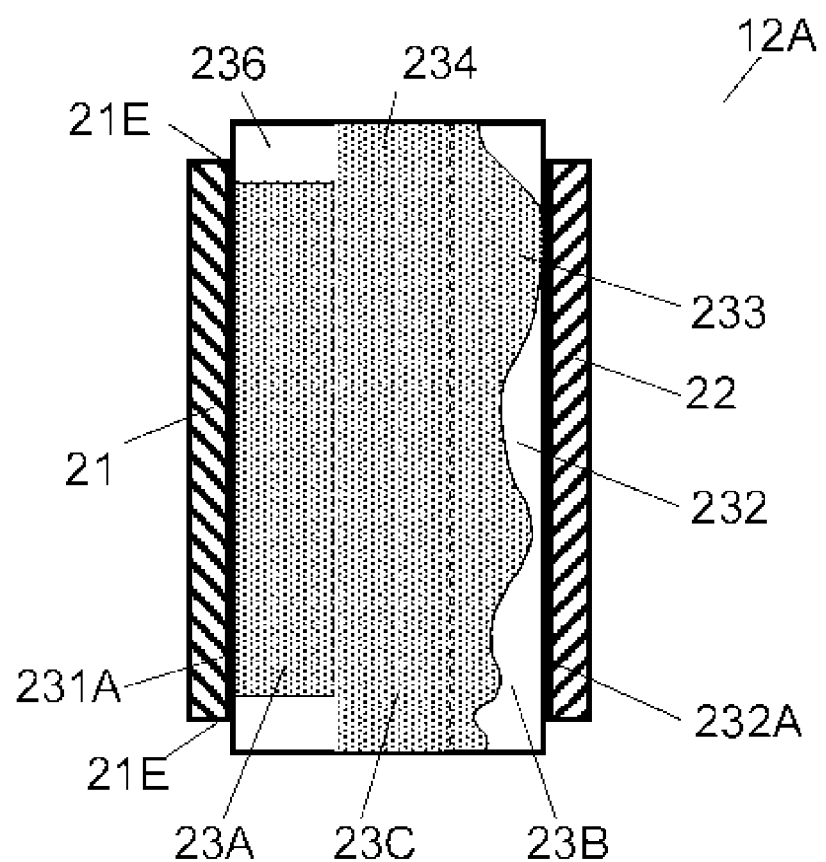

POWER STORAGE DEVICE AND MANUFACTURING METHOD THEREOF

RELATED APPLICATIONS

This application is a Continuation of International Application No. PCT/JP2015/001609, filed on Mar. 23, 2015, which in turn claims priority from Japanese Patent Application No. 2014-068175, filed on Mar. 28, 2014, the contents of all of which are incorporated herein by reference in their entireties.

BACKGROUND

1. Technical Field

The present disclosure relates to power storage devices used in various electronic devices, industrial equipment, automobile equipment, and the like, and relates to manufacturing methods thereof.

2. Description of the Related Art

As high-frequency electronic devices are increased, an electrolytic capacitor, which is one of power storage devices, is required to have large capacity and low equivalent series resistance (hereinafter, referred to as ESR) characteristics in high-frequency regions. Recently, in order to reduce ESR in such high-frequency regions, a solid electrolytic capacitor using, as an electrolyte, a solid electrolyte such as conductive polymers having higher electric conductivity than that of a conventional electrolytic solution, has been put into production. With respect to large-capacity demands for the solid electrolytic capacitor, winding-type solid electrolytic capacitors having a configuration in which interior of a capacitor element wound with a separator interposed between anode foil and cathode foil is filled with conductive polymers has been put into production.

However, the solid electrolytic capacitor as described above uses only a solid electrolyte, which has poor restorability to a dielectric oxide film, as an electrolyte. Therefore, compared with a conventional electrolytic capacitor using an electrolytic solution, increases in leakage current, or short-circuit failures caused along with defects of dielectric oxide film, etc. are likely to occur. Therefore, it is difficult to make a solid electrolytic capacitor having a high withstand voltage.

On the other hand, in order to improve the above described problem, an electrolytic capacitor utilizing, as an electrolyte, both of an electrolytic solution and a solid electrolyte formed by conductive polymers has been proposed. In this electrolytic capacitor, separator paper such as Manila paper or craft paper, a porous film, a synthetic-fiber unwoven fabric, or the like is used as a separator base material. Electrical conductivity is imparted to this separator base material by depositing conductive polymers on the separator base material. Then, a capacitor element is formed by interposing the separator to which electrical conductivity has been imparted (hereinafter, referred to as an electrically-conductive separator) between anode foil and cathode foil. The capacitor element formed in this manner is impregnated with the electrolytic solution (see Unexamined Japanese Patent Publication No. H7-283086, for example).

SUMMARY

A power storage device of the present disclosure has a power storage element and an electrolytic solution.

The power storage element includes an anode body, a cathode body opposed to the anode body, and a separator interposed between the anode body and the cathode body. The separator includes a separator base material and a conductive polymer deposited on the separator base material. The power storage element is impregnated with the electrolytic solution. The separator has a first surface layer, which includes a first surface opposed to the anode body, and a second surface layer, which includes a second surface opposed to the cathode body. The first surface layer has a first region in which the conductive polymer is deposited, and the second surface layer has a second region in which the conductive polymer is not deposited.

A method of manufacturing the power storage device of the present disclosure has following steps. (1) A liquid agent, which is a solution or dispersion liquid of a conductive polymer, is applied to a first surface or a second surface of a separator base material so as to cause the liquid agent to permeate into the separator base material, and then at least part of a solvent or a dispersion medium contained in the liquid agent is vaporized to form a separator having the conductive polymer deposited on the separator base material. (2) An anode body is caused to be opposed to the first surface of the separator, and a cathode body is caused to be opposed to the second surface of the separator to form a power storage element. (3) The power storage element is impregnated with an electrolytic solution. When the separator is formed, a first region in which the conductive polymer is deposited is formed in a first surface layer including the first surface of the separator, and a second region in which the conductive polymer is not deposited is formed in a second surface layer including the second surface of the separator.

According to the power storage device and the manufacturing method thereof according to the present disclosure, ESR in the power storage device can be reduced.

BRIEF DESCRIPTION OF THE DRAWINGS

FIG. 7B is a schematic view showing a region in which conductive polymers are deposited in the power storage element;

DETAILED DESCRIPTION OF EMBODIMENT

Figure 1:
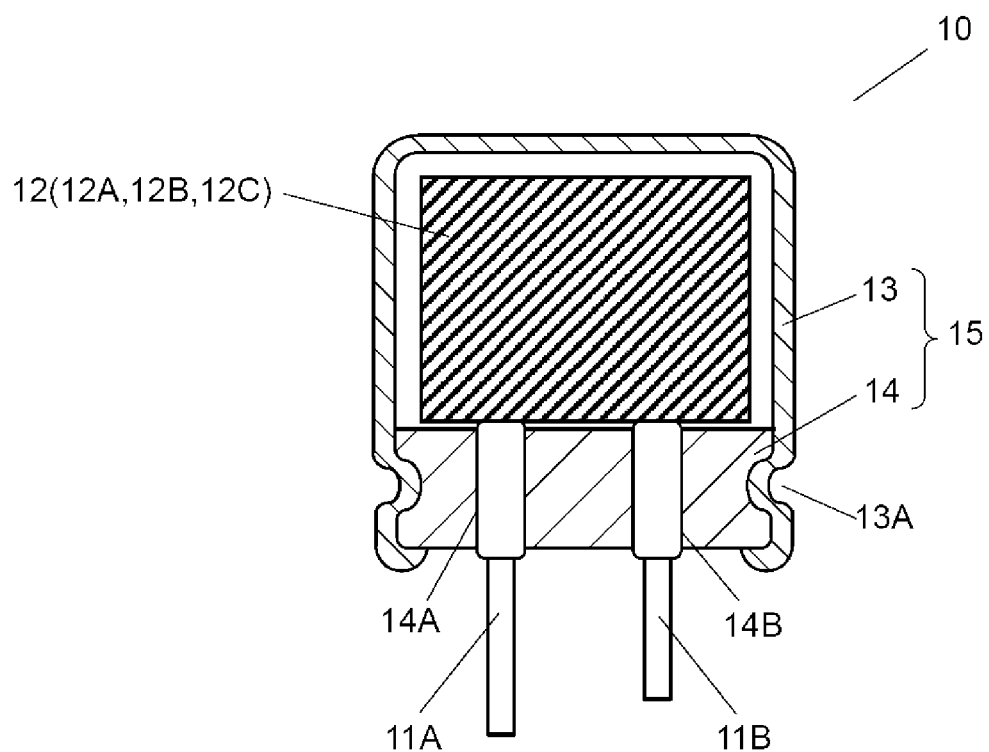
FIG. 1 is a cross-sectional view of a power storage device of first and second exemplary embodiments.

Conventional electrolytic capacitors using electrically-conductive separators have not been able to sufficiently improve ESR characteristics.

Therefore, the present disclosure provides a power storage device using an electrically-conductive separator and particularly provides a power storage device with enhanced ESR characteristics and provides a manufacturing method thereof.

Hereinafter, exemplary embodiments of the present disclosure will be described with reference to the drawings. Note that dimensions are altered in the drawings in order to facilitate understanding.

First Exemplary Embodiment

Figure 2A:
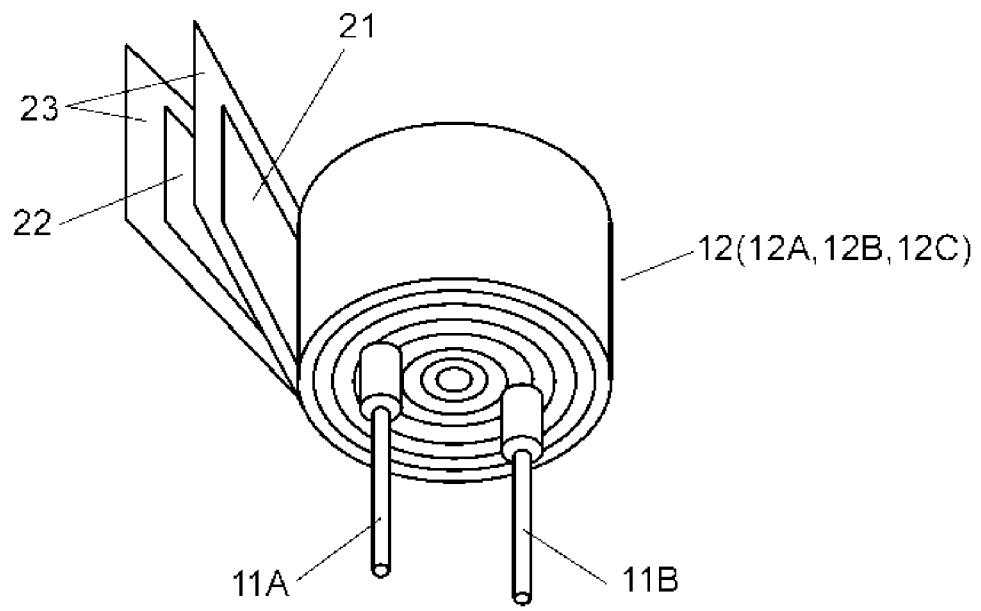
FIG. 2A is a perspective view of a power storage element of the power storage device shown in FIG. 1.
Figure 2B:
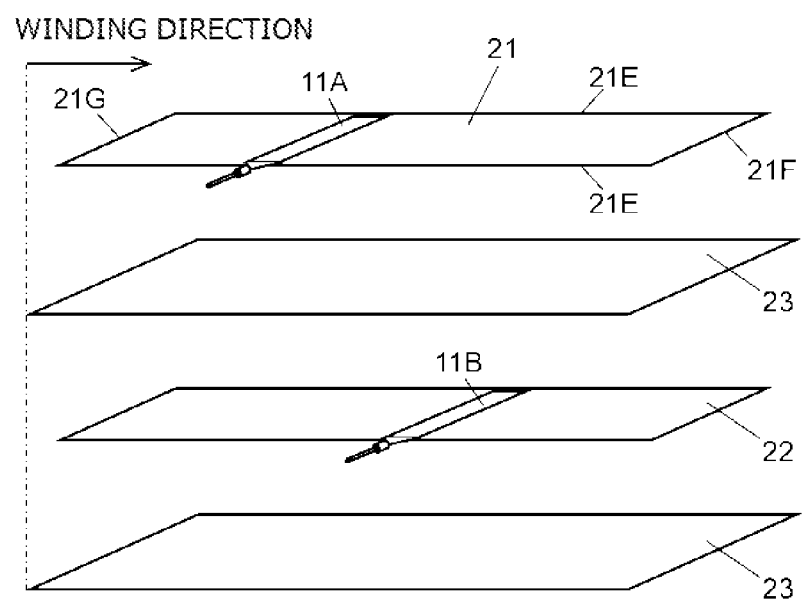
FIG. 2B is a view for describing a laminating relation of an anode body, a cathode body, and separators in the power storage element.
Figure 3A:
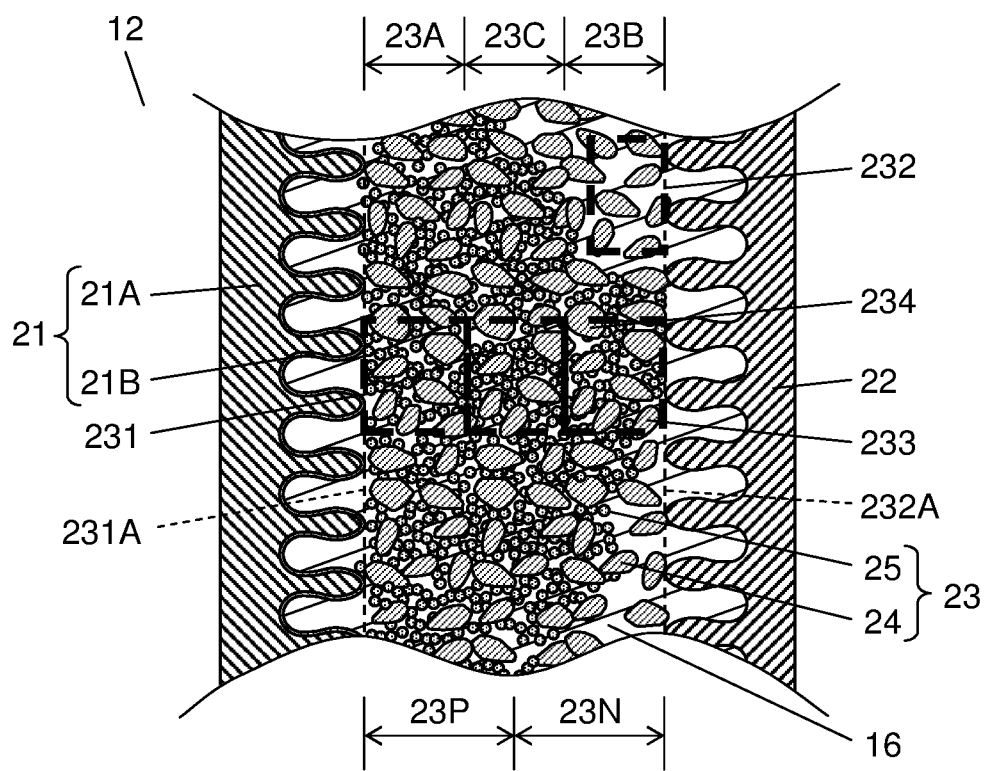
FIG. 3A is a partial cross-sectional schematic view of the power storage element shown in FIG. 2.

FIG. 1 is a cross-sectional view of an electrolytic capacitor, which is an example of power storage device 10 of a first exemplary embodiment of the present disclosure, and FIG. 2A is a perspective view of capacitor element 12, which is a power storage element of power storage device 10 shown in FIG. 1. FIG. 2B is a view for describing a laminating relation of anode body 21, cathode body 22, and separators 23 in capacitor element 12. FIG. 3A is a partial cross-sectional schematic view for describing separator 23, which is interposed between anode body 21 and cathode body 22, and electrolytic solution 16 in capacitor element 12 shown in FIG. 2A.

As shown in FIG. 1, the electrolytic capacitor has capacitor element 12, exterior body 15, and electrolytic solution 16 (see FIG. 3A). As shown in FIG. 2A, capacitor element 12 has anode foil serving as anode body 21, cathode foil serving as cathode body 22, and separator 23 interposed between anode body 21 and cathode body 22. Exterior body 15 includes case 13 having a bottomed tubular shape and opening sealer 14, and seals capacitor element 12 and electrolytic solution 16.

As shown in FIG. 2B, anode lead 11A and cathode lead 11B each having one end part that is flatly formed are respectively joined with strip-shaped anode body 21 and strip-shaped cathode body 22 by ultrasonic welding, needle swaging, or the like. At least a part of anode lead 11A, which is joined with anode body 21, and at least a part of cathode lead 11B, which is joined with cathode body 22, are preferred to be formed of same materials as those of anode body 21 and cathode body 22, respectively. The other end of each of anode lead 11A and cathode lead 11B is extended from an edge face of capacitor element 12.

Capacitor element 12 is formed by winding a laminated body, in which anode body 21, separators 23, and cathode body 22 are stacked, from one end in the stacked state.

As shown in FIG. 3A, anode body 21 has metal foil 21A, which is formed of a valve metal such as aluminum, and dielectric oxide film 21B, which is formed on a surface of metal foil 21A. Dielectric oxide film 21B is formed by subjecting the surface roughened by etching treatment of metal foil 21A to anodizing treatment.

Cathode body 22 is formed of metal such as aluminum. On a surface of the metal such as aluminum, cathode body 22 may be provided with an anodizing film or a film of a dissimilar metal or a non-metal material. Examples of the dissimilar metal and the non-metal material include a metal such as titanium and a non-metal material such as carbon.

As shown in FIG. 3A, separator 23 includes separator base material 24 and conductive polymers 25 deposited on separator base material 24. Thus, separator 23 is a kind of electrically-conductive separators. Note that FIG. 3A shows a cross section of fibrous separator base material 24. Paper or unwoven fabric containing electrically non-conductive fibers such as cellulose, polyethylene terephthalate, polybutylene terephthalate, polyphenylene sulfide, nylon, aromatic polyamides, polyimides, polyamide-imides, polyetherimide, rayon, and/or hyaline can be used as separator base material 24. Alternatively, woven fabric may be used as separator base material 24.

Note that a density of separator base material 24 is preferred to be 0.25 g/cm$^3$ or more to 0.95 g/cm$^3$ or less.

Examples of conductive polymers 25 include polypyrrole, polythiophene, polyfuran, polyaniline, polyacetylene, polyphenylene, polyphenylene vinylene, polyacene, and polythiophene vinylene. These may be singularly used or may be used in combination of two or more species thereof, or a copolymer of the monomers of two or more species thereof may be used. Note that, in the present description, polypyrrole, polythiophene, polyfuran, polyaniline, etc. mean polymers having polypyrrole, polythiophene, polyfuran, polyaniline, etc., respectively, as basic skeletons. Therefore, polypyrrole, polythiophene, polyfuran, polyaniline, etc. may include derivatives thereof. For example, polythiophene includes poly(3,4-ethylene dioxythiophene), etc.

Conductive polymers 25 may contain a dopant. Examples of the dopant include anions of polyvinylsulfonic acid, polystyrensulfonic acid, polyallylsulfonic acid, polyacrylic sulfonic acid, polymethacrylic sulfonic acid, poly(2-acrylamide-2-methylpropane sulfonic acid), polyisoprene sulfonic acid, and polyacrylic acid. Among these, polyanions derived from polystyrensulfonic acid are preferred. These may be singularly used or may be used in combination of two or more species thereof. Also, these may be polymers of single monomers or may be copolymers of the monomers of two or more species.

Conductive polymers 25 function as a cathode of the electrolytic capacitor. Note that conductive polymers 25 are deposited on separator base material 24 by impregnating separator base material 24 with a liquid agent such as dispersion liquid, in which poly(3,4-ethylenedioxythiophene) or the like in the form of fine particles is dispersed in a dispersion medium, or a solution, in which polyaniline or the like is dissolved in a solvent, and then drying. Conductive polymers 25 are formed in connected particulate shapes or a film shape and are deposited on the fibers constituting separator base material 24. Separator 23 is porous and has voids in interior thereof, and electrolytic solution 16 penetrates into the voids. Note that FIG. 3A shows a state in which conductive polymers 25 in the shape of fine particles are deposited on separator base material 24.

In the case in which conductive polymers 25 are to be deposited on separator base material 24 by using the dispersion liquid of the fine particles of conductive polymers 25, sizes of the fine particles of conductive polymers 25 preferably have a diameter of 1 μm or less. If sizes of the fine particles of conductive polymers 25 are greater than the diameter 1 μm, the voids of separator base material 24 are not easily filled with the fine particles, and ESR reduction of the electrolytic capacitor becomes difficult.

Meanwhile, as the dispersion medium or the solvent, a low-viscosity solvent medium such as water or a lower alcohol is preferred. If the low-viscosity solvent medium is used as the dispersion medium or the solvent, a filling effect of conductive polymers 25 with respect to separator base material 24 is enhanced. Furthermore, if a volatile solvent medium is used as the dispersion medium or the solvent, the liquid agent can be easily dried since the solvent medium can be easily removed after capacitor element 12 is impregnated with the dispersion liquid of the fine particles of conductive polymers 25.

Meanwhile, filling performance of conductive polymers 25 with respect to separator base material 24 can be enhanced more by adding a surfactant to the dispersion liquid or the solvent. Examples of the surfactant to be added include anionic surfactants, cationic surfactants, and non-ionic surfactants.

Note that capacitor element 12 may be formed by stacking anode body 21 and cathode body 22 with separator 23 interposed therebetween, which will be described later.

Electrolytic solution 16 functions as the cathode of the electrolytic capacitor. Electrolytic solution 16 penetrates into the voids in separator 23 and holes formed by etching pits of anode body 21.

Electrolytic solution 16 is prepared by dissolving a solute in the solvent. Examples of the usable solvent include alcohols, amide solvents which are non-protonic organic solvents, lactones, and sulfoxides. Examples of the alcohols include methanol, ethanol, propanol, butanol, cyclobutanol, cyclohexanol, ethylene glycol, propylene glycol, glycerin, methyl cellosolve, ethyl cellosolve, methoxypropylene glycol, and polycondensates of glycols. Examples of the amide solvents include N-methylformamide, N,N-dimethylformamide, N-ethylformamide, N,N-diethylformamide, N-methylacetamide, and N,N-dimethylacetamide. Examples of the lactones include γ-butyrolactone, β-butyrolactone, α-valerolactone, and γ-valerolactone. Examples of the sulfoxides include sulfolane, 3-methylsulfolane, and dimethyl sulfoxide. Note that, in an electrolytic capacitor for mid/high voltages, it is preferred to use ethylene glycol as the solvent.

Meanwhile, examples of a base component of an electrolyte component which is the solute include compounds having alkyl-substituted amidine groups, imidazole compounds, benzimidazole compounds, and alicyclic amidine compounds (pyrimidine compounds and imidazoline compounds). Also, as the base component of the electrolyte component, quaternary ammonium of a compound having an alkyl-substituted amidine group can be used. Examples of the quaternary ammonium of the compound having the alkyl-substituted amidine group include imidazole compounds, benzimidazole compounds, and alicyclic amidine compounds (pyrimidine compounds and imidazoline compounds) which are quaternized by alkyl groups or arylalkyl groups having carbon numbers of 1 to 11. Also, usable examples of the base component include ammonium, primary amines (methylamine, ethylamine, propylamine, butylamine, ethylenediamine, monoethanolamine, etc.), secondary amines (dimethylamine, diethylamine, dipropylamine, ethylmethylamine, diphenylamine, diethanolamine, etc.), and tertiary amines (trimethylamine, triethylamine, tributylamine, 1,8-diazabicyclo(5,4,0)-undecene-7, triethanolamine, etc.). Note that, in the electrolytic capacitor of mid/high voltages, ammonium, diethylamine, or triethylamine is preferably used as the base component of the electrolyte component, which is the solute.

Also, usable examples of an acid component of the electrolyte component include: saturated carboxylic acids, which are aliphatic carboxylic acids; unsaturated carboxylic acids; aromatic carboxylic acids; etc. Examples of the aliphatic saturated carboxylic acids include oxalic acid, malonic acid, succinic acid, glutaric acid, adipic acid, pimelic acid, suberic acid, azelaic acid, sebacic acid, 1,6-decane dicarboxylic acid, 5,6-decanedicarboxylic acid, formic acid, acetic acid, propionic acid, butyric acid, isobutyric acid, valeric acid, caproic acid, enanthic acid, caprylic acid, pelargonic acid, lauric acid, myristic acid, stearic acid, and behenic acid. The aliphatic unsaturated carboxylic acids include maleic acid, fumaric acid, itaconic acid, acrylic acid, methacrylic acid, and oleic acid. Examples of the aromatic carboxylic acids include phthalic acid, salicylic acid, isophthalic acid, terephthalic acid, trimellitic acid, pyromellitic acid, benzoic acid, resorcylic acid, cinnamic acid, and naphthoic acid. Meanwhile, other than these carboxylic acids, nitro derivatives of carboxylic acids, sulfonic acid derivatives, phosphoric acid derivatives which are inorganic acids, boric acid derivatives, etc. can be used as the acid component of the electrolyte.

It is preferred that the acid component is contained more than the base component in mole ratio in the electrolyte component. In this case, acidity of the electrolytic solution can be increased and can exert an effect of suppressing dedoping reactions of separators 23. Note that, in the electrolytic capacitor of mid/high voltages, as the acid component of the electrolyte component, which is the solute, it is preferred to use decanedicarboxylic acid such as 1,6-decanedicarboxylic acid, 5,6-decanedicarboxylic acid, etc.; octanedicarboxylic acid such as 1,7-octanedicarboxylic acid; organic acid such as azelaic acid, sebacic acid, benzoic acid, etc.; or boric acid, polyalcohol complex compound of boric acid obtained by boric acid and polyalcohol.

Exterior body 15 seals capacitor element 12 so as to lead respective ends of anode lead 11A and cathode lead 11B, which are extended from capacitor element 12, to outside.

Exterior body 15 has case 13 and opening sealer 14. Case 13 houses capacitor element 12 and electrolytic solution 16. Opening sealer 14 is provided with through-holes 14A, 14B, which allow anode lead 11A and cathode lead 11B to be inserted through through-holes 14A, 14B. Opening sealer 14 is disposed at an opening of case 13 and seals the opening of case 13 by being compressed since an outer peripheral surface of case 13 is narrowed by narrowed portion 13A.

Note that, capacitor element 12 may be housed in case 13 after capacitor element 12 is impregnated with electrolytic solution 16. The way of housing is not limited thereto. For example, electrolytic solution 16 may be injected into case 13 and seal case 13 after capacitor element 12 is housed in case 13, or capacitor element 12 may be housed in case 13 and seal case 13 after electrolytic solution 16 is injected into case 13.

Opening sealer 14 may use rubber materials such as ethylene-propylene rubber and butyl rubber, which is a copolymer of isobutyl and isoprene. Opening sealer 14 may use a resin material such as an epoxy resin, too.

Case 13 may use a metal material such as aluminum.

Figure 3B:
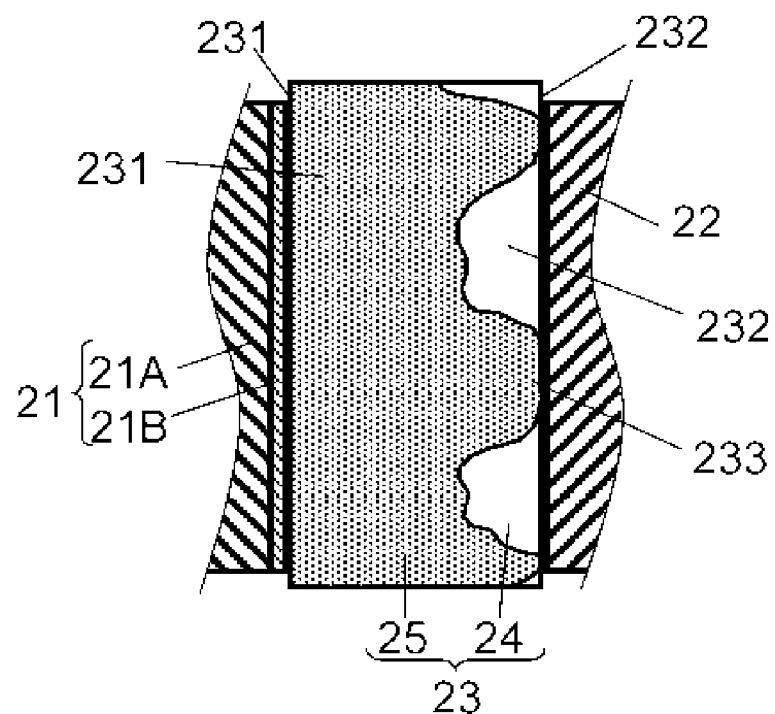
FIG. 3B is a schematic view showing a region in which conductive polymers are deposited in the power storage element.
Figure 3C:
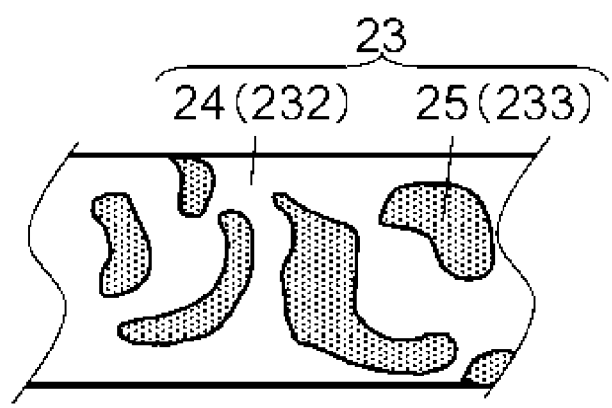
FIG. 3C is a view showing the separator, which is before winding, in the power storage element from a cathode body side.

Next, a configuration of separator 23 will be described in detail with reference to FIG. 2B, FIG. 3A, and FIG. 3B. FIG. 3B is a schematic view showing a region in which conductive polymers 25 are deposited in capacitor element 12. Note that the electrolytic solution is not shown in this view. FIG. 3C is a view showing separator 23, which is before winding, from a cathode body 22 side.

As shown in FIG. 3A and FIG. 3B, separator 23 has first surface layer 23A including first surface 231A opposed to anode body 21, second surface layer 23B including second surface 232A opposed to cathode body 22, and an intermediate layer 23C between first surface layer 23A and second surface layer 23B. First surface layer 23A has first region 231 in which conductive polymers 25 are deposited, and second surface layer 23B has second region 232 in which conductive polymers 25 are not deposited. Note that first surface 231A and second surface 232A are principal surfaces respectively constituting an outer shape of separator 23. Moreover, the etching pits are formed on metal foil 21A of anode body 21, and dielectric oxide film 21B is formed along shapes of the etching pits. In this manner, in anode body 21 having the etching pits, part of a principal surface of anode body 21 on which the etching pits are formed contacts separator 23.

Separator 23 is formed in a following manner. First, the liquid agent, which is the solution or dispersion liquid of conductive polymers 25, is applied to first surface 231A of separator base material 24, and this liquid agent is caused to permeate interior of separator base material 24. Then, at least part of the solvent or dispersion medium contained in the liquid agent is vaporized.

As the liquid agent infiltrates from first surface layer 23A to intermediate layer 23C and second surface layer 23B, an amount of conductive polymers 25 applied to separator base material 24 is gradually reduced. As a result, second region 232 in which conductive polymers 25 are not deposited is formed in second surface layer 23B, and first region 231 in which conductive polymers 25 are deposited is formed in first surface layer 23A. In this manner, as a distance to anode body 21 in the separator is short, a deposition amount of conductive polymers 25 in a cross section, which is approximately parallel to first surface 231A of separator 23 and is approximately perpendicular to a thickness direction of separator 23, is increased. More specifically, the deposition amount of conductive polymers 25 in separator 23 is large in a vicinity of anode body 21, and the deposition amount of conductive polymers 25 in separator 23 is small in a vicinity of cathode body 22.

Note that the deposition amount of conductive polymers 25 with respect to separator 23 can be measured, for example, by subjecting a particular element which is contained in conductive polymers 25 to quantitative analysis by atomic absorption spectrometry, ICP (Inductively Coupled Plasma) atomic emission spectroscopy, energy dispersive X-ray spectrometry (EDAX), or the like. Meanwhile, an adhesion state of the conductive polymers in the thickness direction of separator 23 can be measured by observing a cross section of separator 23 with an optical microscope or the like.

Note that second surface layer 23B has third region 233 in which conductive polymers 25 are deposited. Also in this case, an opposed area of first region 231 in first surface layer 23A with respect to anode body 21 is preferred to be larger than an opposed area of third region 233 in second surface layer 23B with respect to cathode body 22. Herein, "opposed area" refers to the area of the region in which conductive polymers 25 are deposited on a surface opposed to anode body 21 or cathode body 22.

Meanwhile, if the amount of conductive polymers 25 deposited in first region 231 is increased, ESR can be further reduced. However, the amount of conductive polymers 25 which can be deposited in first region 231 is limited. Therefore, in order to further reduce ESR, it is preferred to provide third region 233 in which conductive polymers 25 are deposited in second surface layer 23B in the above described manner.

Note that, in order to measure the opposed area of third region 233 in second surface layer 23B with respect to cathode body 22, a two-dimensional image is acquired by observing second surface layer 23B by an optical microscope or the like as shown in FIG. 3C. The above described opposed area is obtained by measuring an area of a part in which conductive polymers 25 are formed in this two-dimensional image. Likewise about the opposed area of first region 231 in first surface layer 23A with respect to anode body 21, a two-dimensional image is acquired by observing first surface layer 23A by an optical microscope or the like. The above described opposed area is obtained by measuring an area of a part in which conductive polymers 25 are formed in this two-dimensional image.

Note that third region 233 in which conductive polymers 25 are deposited in second surface layer 23B may be provided by applying the liquid agent, which is the solution or the dispersion liquid of conductive polymers 25, also from second surface 232A of separator base material 24.

Moreover, a part from a center of separator 23 in thickness direction to first surface 231A is defined as first separator half body 23P, and a part from the center of separator 23 in thickness direction to second surface 232A is defined as second separator half body 23N. Herein, in the present exemplary embodiment, the amount of conductive polymers 25 deposited in first separator half body 23P is greater than the amount of conductive polymers 25 deposited in second separator half body 23N.

In this manner, the deposition amount of conductive polymers 25 is preferred to be large in the vicinity of anode body 21 of separator base material 24 or in a side close to anode body 21. If the deposition amount of conductive polymers 25 contained in the electrolytic capacitor is constant, this configuration can provide a smaller ESR of the electrolytic capacitor than that in a configuration in which the deposition amount of conductive polymers 25 is large in the vicinity of cathode body 22 of separator base material 24 or the side close to cathode body 22, or that in a configuration in which conductive polymers 25 are deposited approximately equally in all the regions of separator base material 24.

Note that second surface layer 23B may be formed only of second region 232 without having third region 233. In this case, conductive polymers 25 are not exposed to second surface 232A. In such a configuration, if a total deposition amount of conductive polymers 25 contained in the electrolytic capacitor is constant, ESR can be efficiently reduced since many conductive polymers 25 are deposited in the anode body 21 side of separator 23. Furthermore, as a result, an amount of conductive polymers 25 that has to be used can be also reduced.

If third region 233 in which conductive polymers 25 are deposited is provided in second surface layer 23B and if separator 23 has intermediate layer 23C, intermediate layer 23C is preferred to have fourth region 234 in which conductive polymers 25 are deposited. Conductive polymers 25 deposited in third region 233 and conductive polymers 25 deposited in first region 231 are preferred to be mutually connected via conductive polymers 25 deposited in fourth region 234. Mutual connections of the fine particles or film of conductive polymers 25 exert an effect of reducing ESR. Therefore, conductive polymers 25 are preferred to be connected in separator 23.

Figure 4:
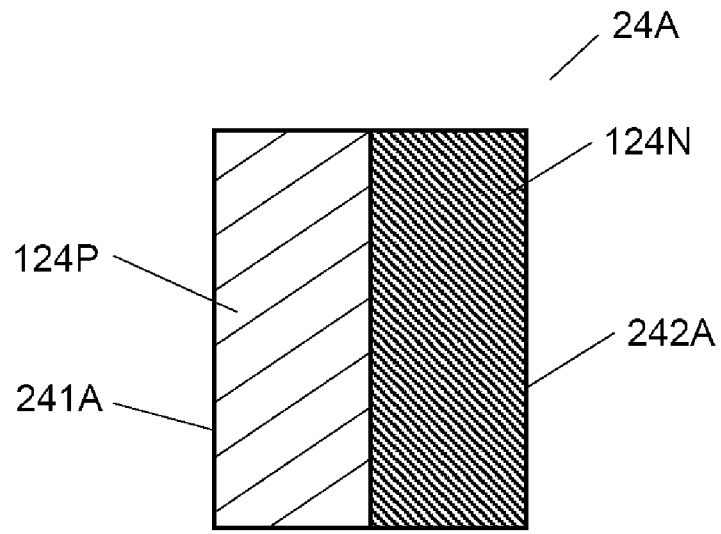
FIG. 4 is a schematic view showing another example of a separator base material shown in FIG. 3A to FIG. 3C.
Figure 5:
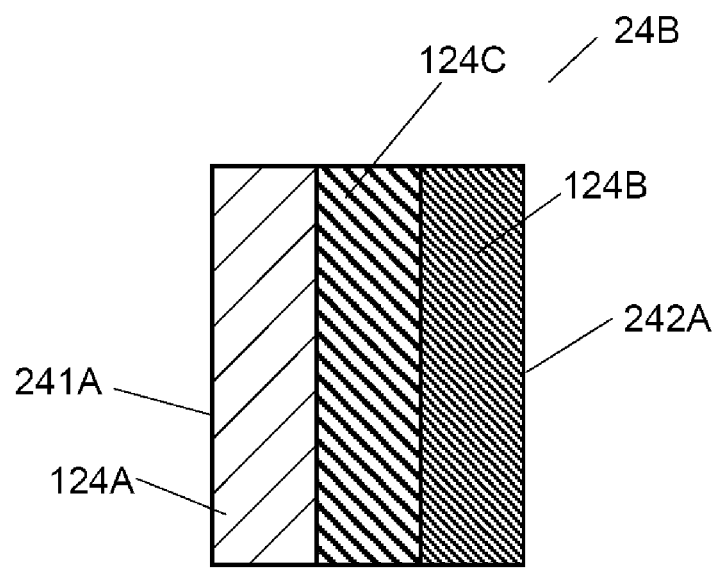
FIG. 5 is a schematic view showing still another example of the separator base material shown in FIG. 3A to FIG. 3C.

Next, another aspect of the separator base material will be described with reference to FIG. 4 and FIG. 5. FIG. 4 and FIG. 5 are schematic views respectively showing separator base materials 24A, 24B, which are other examples of the separator base material.

Separator base material 24A shown in FIG. 4 has first base material layer 124P and second base material layer 124N. First base material layer 124P includes first surface 241A of separator base material 24A and is disposed to be adjacent to anode body 21. Second base material layer 124N includes second surface 242A of separator base material 24A and is disposed to be adjacent to the cathode body 22. First base material layer 124P contains fibers having a low density compared with that of second base material layer 124N. In other words, airtightness of first base material layer 124P is lower than airtightness of second base material layer 124N. Note that first surface 241A and second surface 242A are principal surfaces respectively constituting an outer shape of separator base material 24A.

As a result of forming the electrically-conductive separator by using separator base material 24A as described above, a fiber density of first surface layer 23A is lower than a fiber density of second surface layer 23B. For example, when the liquid agent, which is the solution or dispersion liquid of conductive polymers 25, is applied to first surface 241A of separator base material 24A, the liquid agent easily infiltrates in first base material layer 124P, and a large amount of the liquid agent can be retained. As a result, in first surface layer 23A formed of first base material layer 124P, the first region in which conductive polymers 25 are surely deposited is formed. This configuration is effective in a case in which the amount of conductive polymers 25 deposited in separator base material 24A is desired to be increased in the anode body side of the separator. Specifically, a difference between the fiber density of first base material layer 124P and the fiber density of second base material layer 124N is preferred to be 0.1 g/cm$^3$ or more.

Alternatively, separator base material 24B shown in FIG. 5 may be used. Separator base material 24B has intermediate base material layer 124C between first base material layer 124A and second base material layer 124B. A fiber density of first base material layer 124A is lower than a fiber density of second base material layer 124B. Also in this case, as well as separator base material 24A, the fiber density of first surface layer 23A is lower than the fiber density of second surface layer 23B, and the first region in which conductive polymers 25 are deposited is formed in first surface layer 23A formed of first base material layer 124A. Note that a fiber density of intermediate base material layer 124C may be greater or smaller than that of first base material layer 124A. If the fiber density of intermediate base material layer 124C is greater than the fiber density of first base material layer 124A, permeation of the liquid agent, which is the solution or dispersion liquid of conductive polymers 25, in a region from intermediate base material layer 124C to second base material layer 124B is suppressed. Therefore, the deposition amount of conductive polymers 25 can be more increased in first base material layer 124A, and the effect of reducing ESR is enhanced. When the fiber density of intermediate base material layer 124C is smaller than that of first base material layer 124A, rigidity of separator 23 is reduced, and workability in a case of stacking or in a case of winding can be improved. Therefore, the fiber density of intermediate base material layer 124C can be adjusted depending on required characteristics.

Note that changing of the fiber density in the thickness direction like separator base materials 24A, 24b may employ, a method for changing types of fibers during paper making, a method for changing dispersion concentrations, a method for forming the separator base material by mutually pasting a plurality of sheets of separator paper having mutually different fiber densities, etc.

Second Exemplary Embodiment

Figure 6:
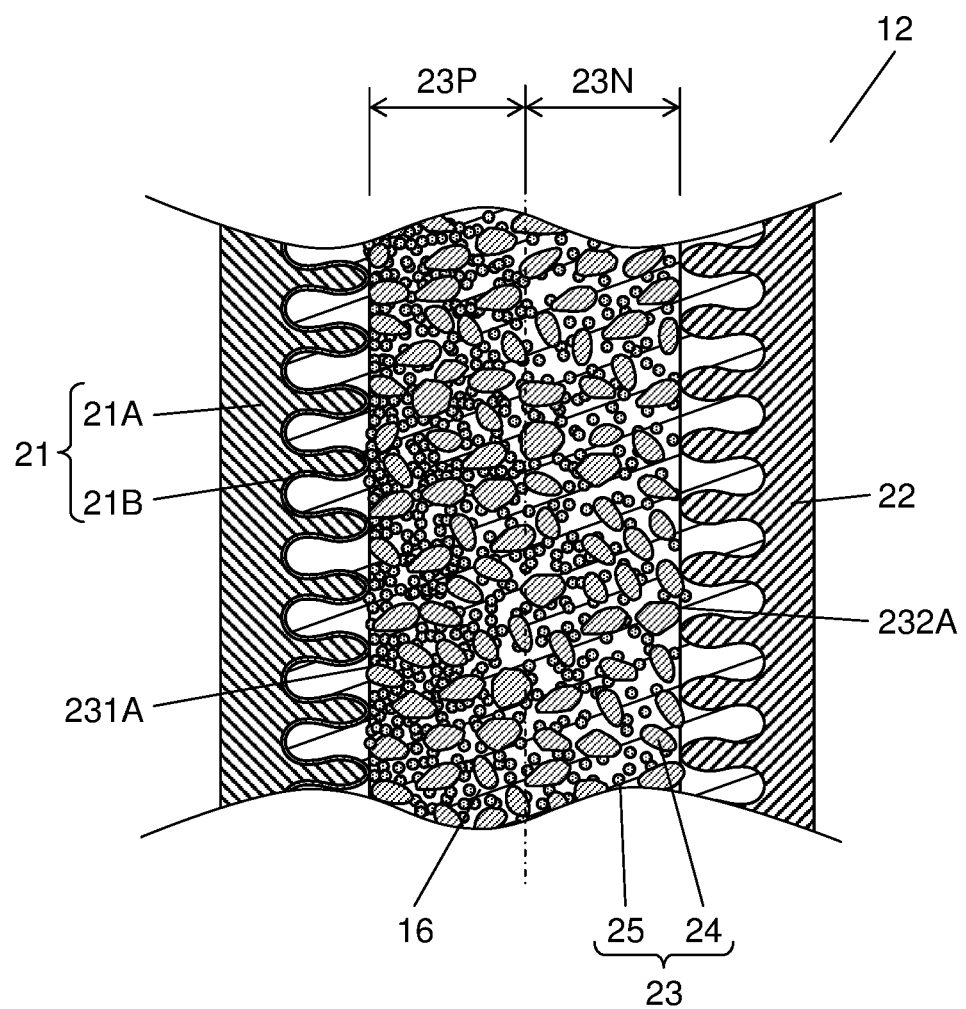
FIG. 6 is a partial cross-sectional schematic view of a power storage element of the second exemplary embodiment.

FIG. 6 is a partial cross-sectional schematic view for describing separator 23, which is interposed between anode body 21 and cathode body 22, and electrolytic solution 16 of capacitor element 12, which is an example of the power storage element in a second exemplary embodiment of the present disclosure. Note that, since basic structures of the electrolytic capacitor, which is a power storage device according to the present exemplary embodiment, and capacitor element 12 are similar to those of the first exemplary embodiment described with reference to FIG. 1 and FIG. 2, description thereof is omitted. Those having similar configurations will be described with same reference signs, and detailed descriptions thereof may be omitted.

As shown in FIG. 6, separator 23 is provided with separator base material 24, which has first surface 231A opposed to anode body 21 and has second surface 232A opposed to cathode body 22, and is provided with conductive polymers 25, which are deposited on first surface 231A of separator base material 24 and on a vicinity thereof and deposited on second surface 232A and on a vicinity thereof. Note that first surface 231A and second surface 232A are part of surfaces constituting the outer shape of separator 23. Moreover, as described above, the etching pits are formed on metal foil 21A of anode body 21, and dielectric oxide film 21B is formed along the shapes of the etching pits. In this manner, in anode body 21 having the etching pits, part of the surface constituting anode body 21 is in contact with separator 23.

The deposition amount of conductive polymers 25, which are deposited on first surface 231A of separator base material 24, per unit area of separator base material 24 is greater than the deposition amount of conductive polymers 25, which are deposited on second surface 232A of separator base material 24, per unit area of separator base material 24.

A method for forming separator 23 in the second exemplary embodiment will be described.

A description will now be given of a method for forming separator 23 by depositing conductive polymers 25 on separator base material 24 at a step before capacitor element 12 is formed by winding anode body 21, separators 23, and cathode body 22.

The liquid agent, which is the solution or dispersion liquid of conductive polymers 25, is applied to first surface 231A, which is the surface of one side of separator base material 24, and this liquid agent is caused to permeate the interior of separator base material 24 from first surface 231A of separator base material 24. Then, the solvent or the dispersion medium contained in the liquid agent is vaporized.

After the solvent or the dispersion medium in the liquid agent applied to separator base material 24 is vaporized, conductive polymers 25 are deposited on separator base material 24.

In this process, in order to cause the deposition amount of conductive polymers 25, which are deposited on first surface 231A of separator base material 24, per the unit area of separator base material 24 to be greater than the deposition amount of conductive polymers 25, which are deposited on second surface 232A of separator base material 24, per the unit area of separator base material 24, the amount of the liquid agent applied to first surface 231A of separator base material 24, a concentration of conductive polymers in the liquid agent, a number of application of conductive polymers, and the density of separator base material 24, etc. are controlled.

Note that, as a method of depositing conductive polymers 25 on separator base material 24, it is possible to employ a method for applying the liquid agent from both of the surfaces, i.e., first surface 231A and second surface 232A of separator base material 24. In this case, the amount and concentration of the liquid agent applied from first surface 231A and second surface 232A of separator base material 24 can be controlled.

In this manner, when conductive polymers 25 are deposited on separator base material 24, electrical conductivity can be applied to separator 23, and ESR of the electrolytic capacitor can be reduced. The deposition amount of conductive polymers 25, which are deposited on first surface 231A of separator base material 24, per the unit area of separator base material 24 can be greater than the deposition amount of conductive polymers 25, which are deposited on second surface 232A of separator base material 24, per the unit area of separator base material 24. Therefore, the amount of conductive polymers 25 which are present in the vicinity of anode body 21 of electrolytic capacitor 1 or the amount of conductive polymers 25 which are in contact with anode body 21 is increased, and ESR of the electrolytic capacitor is reduced.

Note that, in the present exemplary embodiment, in order to obtain the effect reducing ESR of the electrolytic capacitor, the deposition amount of conductive polymers 25, which are deposited on first surface 231A of separator base material 24, per the unit area of separator base material 24 is preferred to be greater than the deposition amount of conductive polymers 25, which are deposited on second surface 232A, per the unit area of separator base material 24 by 5% (weight) or more and is more preferred to be greater than that by 10% (weight) or more.

As shown in FIG. 6, the amount of conductive polymers 25 deposited in first separator half body 23P is greater than the amount of conductive polymers 25 deposited in second separator half body 23N, wherein the part from the center of separator 23 in thickness direction to first surface 231A is defined as first separator half body 23P, and the part from the center of separator 23 in thickness direction to second surface 232A is defined as second separator half body 23N. When such a configuration is employed, ESR of electrolytic capacitor can be further reduced.

As shown in FIG. 6, conductive polymers 25 deposited on first surface 231A and conductive polymers 25 deposited on second surface 232A are connected to each other via conductive polymers 25 in separator 23. When such a configuration is employed, ESR can be further reduced.

Note that, in the present exemplary embodiment, conductive polymers 25 are deposited from first surface 231A of separator base material 24 to second surface 232A. However, conductive polymers 25 may be deposited from first surface 231A of separator base material 24 to an intermediate position of separator base material 24 in thickness direction so that conductive polymers 25 are not deposited on second surface 232A. When such a configuration is employed, a withstand voltage of the electrolytic capacitor can be also improved.

Note that, when application of the liquid agent to first surface 231A of separator base material 24 and vaporization of the solvent or the dispersion medium contained in the liquid agent after the application are repeatedly carried out a plurality of times, the number of the conductive polymers deposited in the vicinity of first surface 231A of separator base material 24 can be increased more, and, therefore, ESR of the electrolytic capacitor can be further reduced.

Note that the deposition amount of the conductive polymers, which are deposited on first surface 231A or on second surface 232A of separator base material 24, per the unit area can be measured by analyzing a distribution state of a particular element(s) of the surfaces (determined by constituent elements of the used conductive polymers) by EDAX (energy dispersive X-ray spectrometry).

Third Exemplary Embodiment

Figure 7A:
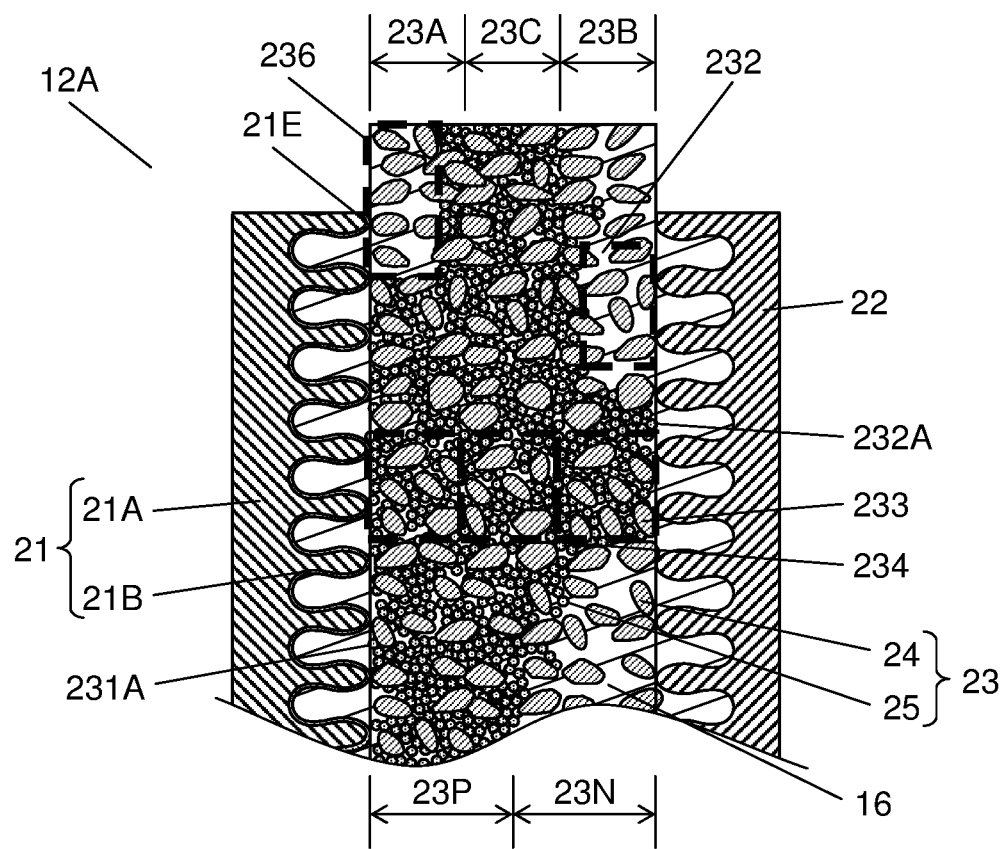
FIG. 7A is a partial cross-sectional schematic view of a power storage element of a third exemplary embodiment.

FIG. 7A is a partial cross-sectional schematic view for describing separator 23, which is interposed between anode body 21 and cathode body 22, and electrolytic solution 16 of capacitor element 12A, which is an example of the power storage element in a third exemplary embodiment of the present disclosure. FIG. 7B is a schematic view showing a region in which conductive polymers 25 are deposited in capacitor element 12A. Note that, since basic structures of the electrolytic capacitor, which is power storage device 10 according to the third exemplary embodiment, and capacitor element 12A are similar to those of the first exemplary embodiment described with reference to FIG. 1 and FIG. 2, description thereof is omitted. Those having similar configurations will be described with same reference signs, and detailed descriptions thereof may be omitted.

In capacitor element 12A, fifth region 236 in which conductive polymers 25 are not deposited is provided at a position in first surface layer 23A of separator 23 that is opposed to edge 21E of anode body 21.

FIG. 7A schematically shows a part of separator 23 sandwiched by anode body 21 and cathode body 22 in a cross section of capacitor element 12A shown in FIG. 1. Fifth region 236 of first surface layer 23A of separator 23 is provided at the position opposed to edge 21E of anode body 21 along the winding direction shown in FIG. 2B.

Metal foil 21A constituting anode body 21 has dielectric oxide film 21B on a surface thereof. Anode body 21 is formed by cutting wide strip-shaped metal foil 21A, which has dielectric oxide film 21B formed thereon, into a size suitable for a capacity of the electrolytic capacitor. Therefore, dielectric oxide film 21B is not formed on a cut portion of anode body 21 after the cutting, and a part of metal foil 21A is exposed therefrom. Therefore, dielectric oxide film 21B is formed on the part of metal foil 21A, which is exposed at the cut portion, by carrying out an additional process of forming dielectric oxide film 21B on the cut portion or by forming dielectric oxide film 21B on the part of metal foil 21A at the cut portion by using a restoring effect brought about by electrolytic solution 16. However, dielectric oxide film 21B at the cut portion formed by such manners has bad film quality, easily causes defects such as cracks. Thus, this configuration brings a bad affection on withstand voltage characteristics of the electrolytic capacitor.

In separator 23 of the third exemplary embodiment, fifth region 236 is formed at the position opposed to edge 21E corresponding to the cut portion of metal foil 21A. In this manner, since first region 231 in which conductive polymers 25 are deposited is not formed at the position opposed to edge 21E at which defects easily occur in dielectric oxide film 21B in separator 23, the withstand voltage characteristics are also improved in addition to improvement of the ESR characteristics of the electrolytic capacitor.

Note that, if the total deposition amount of conductive polymers 25 deposited on separator base material 24 is constant, in order to efficiently reduce ESR, conductive polymers 25 are preferred to be deposited in the anode body 21 side of separator base material 24 as much as possible. In other words, conductive polymers 25 present in third region 233 in which conductive polymers 25 are deposited in second surface layer 23B are preferred to be as few as possible.

In order to form fifth region 236 in which conductive polymers 25 are not deposited at the position opposed to edge 21E of anode body 21 in separator 23 in this manner and to form first region 231 in which conductive polymers 25 are deposited in first surface layer 23A, the liquid agent, which is the solution or dispersion liquid of conductive polymers 25, is applied to first surface 231A opposed to anode body 21 of separator base material 24. Then, after the liquid agent permeates the interior of separator base material 24, the solvent or the dispersion medium contained in the liquid agent is vaporized. In this process, first region 231 and fifth region 236 can be formed at the predetermined positions of first surface layer 23A by applying the liquid agent by a printing method such as an ink-jet method.

If the liquid agent is applied also to second surface 232A of separator base material 24 by a printing method such as an ink-jet method, second region 232 in which conductive polymers 25 are not deposited can be formed in second surface layer 23B. Thus, as a result of using the printing method in the application of the liquid agent to separator base material 24, when separator 23 is formed, a no-application part to which the liquid agent is not applied remains in first surface 231A of separator base material 24, and a no-application part to which the liquid agent is not applied can be provided also in second surface 232A of separator base material 24. Also, as a result of applying the liquid agent to separator base material 24 by the printing method, the regions to which the liquid agent is applied can be easily controlled, and the no-application parts can be formed. Therefore, in separator 23, the regions in which conductive polymers 25 are deposited and the regions in which conductive polymers 25 are not deposited can be easily formed.

Note that, as the printing method, for example, an appropriate method such as the ink-jet method, a gravure coater method, a screen printing method, or the like can be employed. Among these, the ink-jet method is preferred since the ink-jet method is capable of easily controlling the regions to which the liquid agent is deposited and, furthermore, is excellent in controllability of the application amount of the liquid agent.

In this manner, also in the third exemplary embodiment, first surface layer 23A has first region 231 in which conductive polymers 25 are deposited, and second surface layer 23B has second region 232 in which conductive polymers 25 are not deposited.

Moreover, second surface layer 23B has third region 233 in which conductive polymers 25 are deposited. The opposed area of first region 231 in first surface layer 23A with respect to anode body 21 is larger than the opposed area of third region 233 in second surface layer 23B with respect to cathode body 22. This is for a reason that second region 232 is formed in second surface layer 23B in separator 23. The above described configuration can be formed by causing the area of the application regions of the liquid agent in first surface 231A to be larger than the area of the application regions of the liquid agent in second surface 232A.

Furthermore, intermediate layer 23C has fourth region 234 in which conductive polymers 25 are deposited. Conductive polymers 25 deposited in third region 233 and conductive polymers 25 deposited in first region 231 are mutually connected via conductive polymers 25 deposited in fourth region 234. Effects thereof are similar to those of the first exemplary embodiment.

Next, other configurations according to the third exemplary embodiment will be described with reference to FIG. 8 and FIG. 9.

Figure 8:
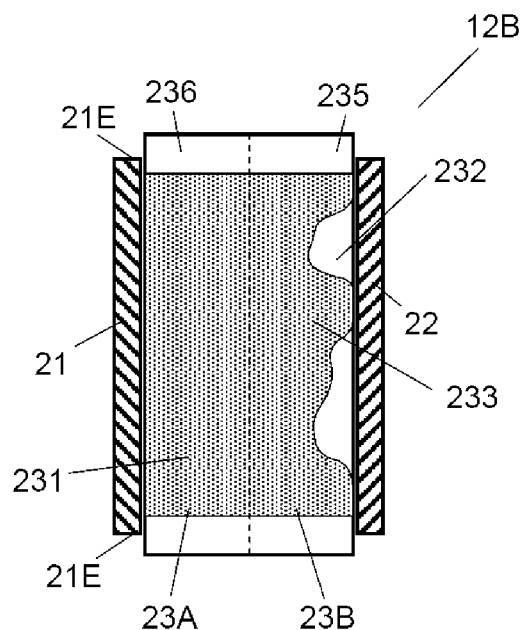
FIG. 8 is a schematic view showing a region in which conductive polymers are deposited in another power storage element of the third exemplary embodiment.
Figure 9:
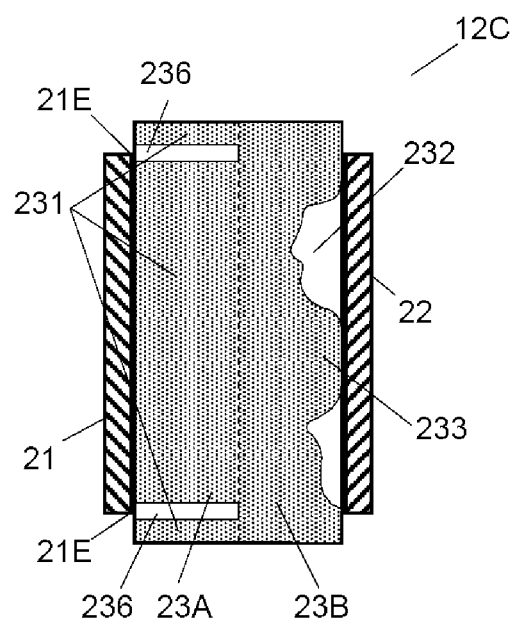
FIG. 9 is a schematic view showing a region in which conductive polymers are deposited in still another power storage element of the third exemplary embodiment.

FIG. 8 and FIG. 9 are schematic views showing regions in which conductive polymers 25 are deposited in other capacitor elements 12B, 12C in the third exemplary embodiment of the present disclosure.

In capacitor element 12B shown in FIG. 8, as well as the configurations shown in FIG. 7A and FIG. 7B, in first surface layer 23A of separator 23, fifth region 236 in which conductive polymers 25 are not deposited is provided at a position opposed to edge 21E of anode body 21. At a position in second surface layer 23B corresponding to fifth region 236, second region 235 in which conductive polymers 25 are not deposited is provided. In order to provide fifth region 236 at the position opposed to edge 21E of anode body 21 in first surface layer 23A in this manner, the liquid agent containing conductive polymers 25 is not applied to the position which is to serve as second region 235 of second surface layer 23B. In this configuration, infiltration of the liquid agent to the position opposed to edge 21E of anode body 21 in first surface layer 23A is suppressed more. Therefore, fifth region 236 can be formed at the position opposed to edge 21E of anode body 21 in first surface layer 23A, and the withstand voltage characteristics are also improved.

On the other hand, in separator 23 in capacitor element 12C shown in FIG. 9, fifth region 236 is provided at the position opposed to edge 21E of anode body 21 in separator 23. Conductive polymers 25 are deposited also in an outer side of fifth region 236 of separator base material 24. More specifically, first region 231 is formed so as to sandwich the region in which fifth region 236 is provided. If a width of separator 23 is wider than a width of anode body 21, ESR of electrolytic capacitor can be further reduced by imparting electrical conductivity to a location of separator 23 protruding from an end of anode body 21. Note that this configuration can be also formed by applying the liquid agent, which is containing conductive polymers 25, to first surface 231A by printing.

Note that intermediate layer 23C is not shown in FIG. 8 and FIG. 9, and first surface layer 23A and second surface layer 23B may be directly connected to each other in this manner without intermediate layer 23C. If intermediate layer 23C is provided in a manner shown in FIG. 7B, a width (in other words, thickness) of a region thereof is not particularly limited. Note that, in order to further reduce ESR, the amount of the conductive polymers that has to be used becomes large, and conductive polymers 25 are preferred to be present also in second surface layer 23B.

Next, other configurations according to the third exemplary embodiment will be described with reference to FIG. 10 and FIG. 11.

Figure 10:
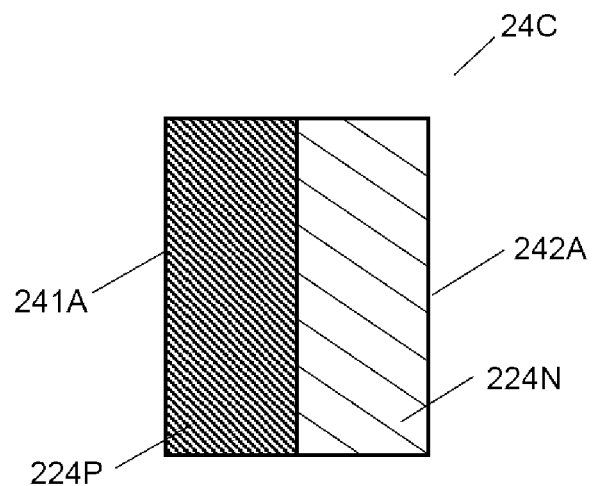
FIG. 10 is a schematic view showing another example of the separator base material shown in FIG. 7A and FIG. 7B.

Separator base material 24C shown in FIG. 10 has first base material layer 224P and second base material layer 224N. First base material layer 224P includes first surface 241A of separator base material 24C and is disposed to be adjacent to anode body 21. Second base material layer 224N includes second surface 242A of separator base material 24C and is disposed to be adjacent to the cathode body 22. A fiber density of first base material layer 224P is greater than a fiber density of second base material layer 224N. In other words, airtightness of first base material layer 224P is greater than airtightness of second base material layer 224N.

Therefore, compared with second base material layer 224N, first base material layer 224P has less gaps into which the liquid agent containing conductive polymers 25 infiltrates. Therefore, when the liquid agent containing the conductive polymers is applied from the first surface 241A side, the liquid agent containing conductive polymers 25 does not easily infiltrate into separator base material 24C, and conductive polymers 25 can be deposited in a vicinity of first surface 241A of first base material layer 224P in a concentrated manner. As a result, ESR can be reduced. Specifically, a difference between the fiber density of first base material layer 224P and the fiber density of second base material layer 224N is preferred to be 0.1 g/cm$^3$ or more.

Figure 11:
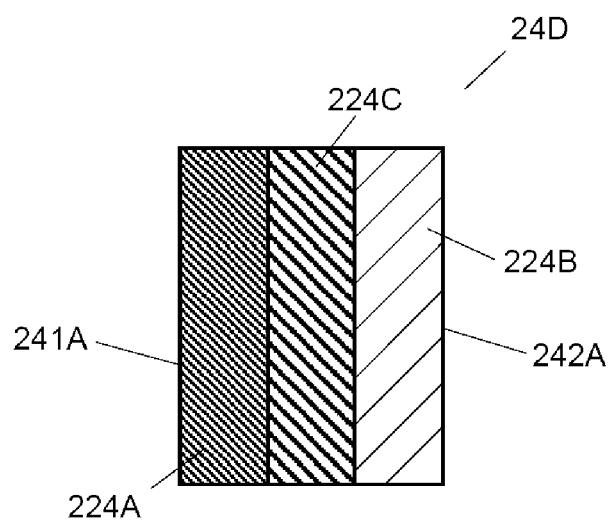
FIG. 11 is a schematic view showing still another example of the separator base material shown in FIG. 7A and FIG. 7B.

Alternatively, separator base material 24D shown in FIG. 11 may be used. Separator base material 24D has intermediate base material layer 224C between first base material layer 224A and second base material layer 224B. A fiber density of first base material layer 224A is greater than a fiber density of second base material layer 224B. Also in this case, as well as separator base material 24C, when the liquid agent containing the conductive polymers is applied from the first surface 241A side, the liquid agent containing conductive polymers 25 does not easily infiltrate into separator base material 24D, and conductive polymers 25 can be deposited in a vicinity of first surface 241A of first base material layer 224A in a concentrated manner. Note that a fiber density of intermediate base material layer 224C may be greater or smaller than that of first base material layer 224A.

If the fiber density of intermediate base material layer 224C is greater compared with that of first base material layer 224A, the deposition amount of conductive polymers 25 can be increased more in first base material layer 224A, and the effect of reducing ESR is enhanced. If the fiber density of intermediate base material layer 224C is smaller than that of first base material layer 224A, rigidity of separator 23 is reduced, and workability in a case of stacking or in a case of winding can be improved. Therefore, the fiber density of intermediate base material layer 224C can be adjusted depending on required characteristics.

Note that changing of the fiber density in the thickness direction of separator base material 24 like separator base materials 24C, 24D may employ, a method for changing types of fibers during paper making, a method for changing dispersion concentrations, a method for forming the separator base material by mutually pasting a plurality of sheets of separator paper having mutually different fiber densities, etc. as well as separator base materials 24A and 24B of the first exemplary embodiment.

Note that, for example, in FIG. 10 and FIG. 11, the amount of the liquid agent which permeates separator base materials 24C, 24D having mutually different densities is adjusted by using separator base materials 24C, 24D having different densities to cause conductive polymers 25 to present in the vicinity of first surface 241A in a concentrated manner. However, the amount of the liquid agent which permeates separator base material 24 is not determined only by the density of separator base material 24. The amount is changed also by the concentration of conductive polymers 25 contained in the liquid agent and affinity of the solvent or the dispersion medium with a material of the separator base material. It is preferred to adjust the amount of the liquid agent which permeates separator base material 24 by adjusting these conditions.

Figure 12:
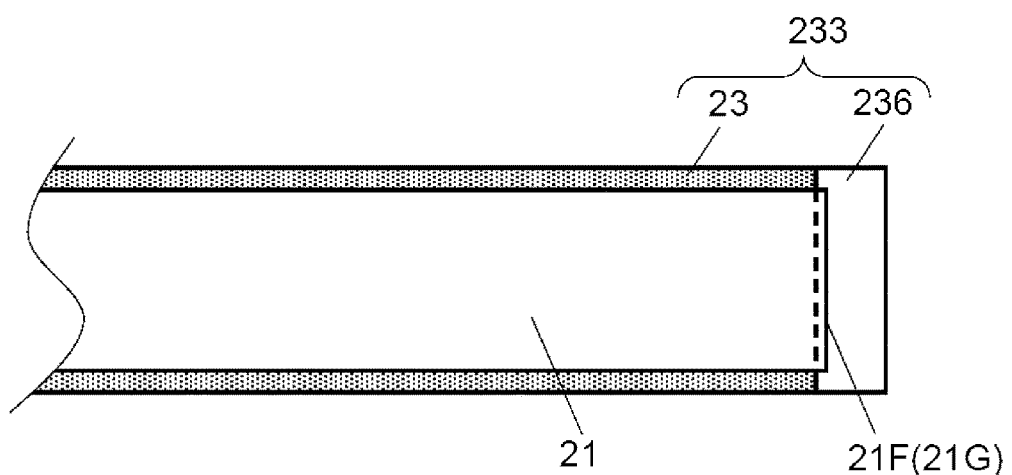
FIG. 12 is a plan view showing a positional relation of anode foil, which is an anode body, and a separator in a power storage element of the third exemplary embodiment.

Next, other configurations of the position to provide fifth region 236 will be described with reference to FIG. 12 to FIG. 14. In a configuration shown in FIG. 12, in first surface layer 23A of separator 23, fifth region 236 in which conductive polymers 25 are not deposited is provided at a position opposed to edge 21F of a winding end of anode body 21. Alternatively, fifth region 236 may be provided at a position opposed to edge 21G of a winding start of anode body 21, or fifth regions 236 may be provided in both of them. As well as edge 21E along the winding direction shown in FIG. 2B, defects are easily generated in dielectric oxide films also in edge 21F of the winding start and in edge 21G of the winding end. Therefore, in first surface layer 23A of separator 23, fifth region(s) 236 is formed at the position(s) opposed to edge 21F of the winding start of anode body 21 and/or to edge 21G of the winding end. As a result, withstand voltage characteristics can be improved.

Note that, in separator 23, a length of edge 21E along the winding direction is longer than a length of edge 21F of the winding start or of edge 21G of the winding end. Therefore, fifth region 236 is preferred to be provided at the position opposed to edge 21E, which is along the winding direction, and effects of improving withstand voltage characteristics can be enhanced.

Figure 13:
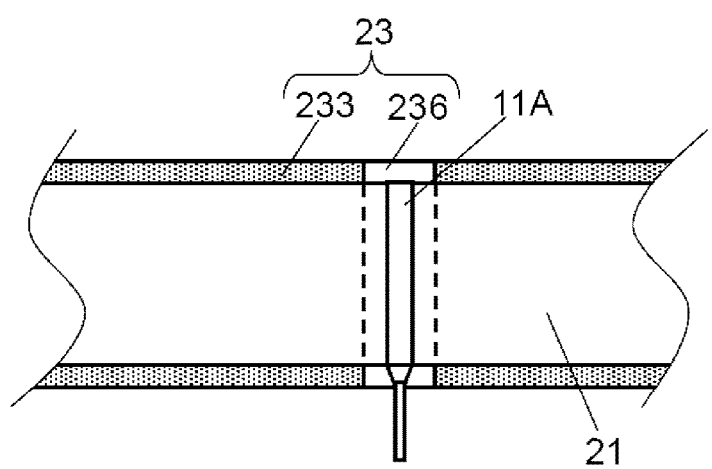
FIG. 13 is a plan view showing a positional relation of anode lead, which is connected to the anode foil, and the separator in a power storage element of the third exemplary embodiment.
Figure 14:
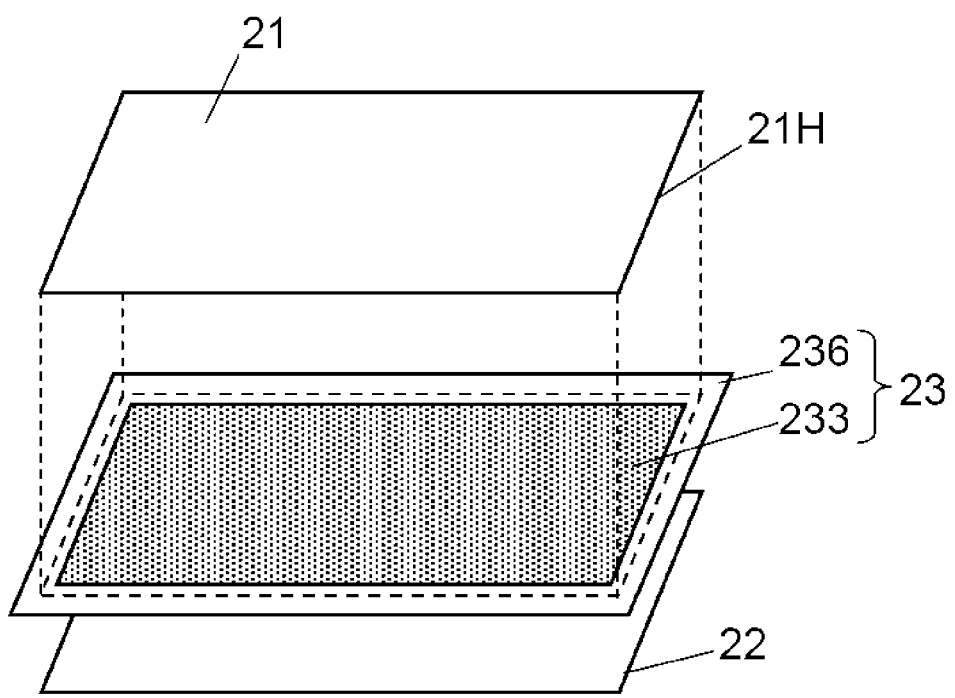
FIG. 14 is an exploded perspective view showing a positional relation of an anode body, a separator, and a cathode body in another power storage element of the third exemplary embodiment.

In a configuration shown in FIG. 13, in first surface layer 23A of separator 23, fifth region 236 is provided at a position opposed to a connecting location connecting anode body 21 with anode lead 11A. Anode lead 11A is connected to a predetermined position such as a vicinity of a central portion of anode body 21 in the longitudinal direction. The location at which anode lead 11A and anode body 21 are connected generates a level difference caused by a thickness of anode lead 11A and is easily affected by mechanical stress. Thus, this configuration brings defects such as cracks easily occur in the dielectric oxide film in a vicinity of the connecting location of anode body 21 and anode lead 11A. After anode lead 11A and anode body 21 are connected to each other, in the dielectric oxide film restored in the vicinity of the connecting location, defects such as cracks easily occur. Therefore, formation of fifth region 236 at the position opposed to this location largely contributes to improvement of the withstand voltage characteristics.

Note that an attachment location of anode lead 11A is not limited thereto, and anode lead 11A may be connected in a vicinity of the edge of the winding start or the winding end of anode body 21. Also in this case, similar effects can be obtained by providing fifth region 236 at a position opposed to the attachment location of anode lead 11A.

Note that, as a matter of course, it is preferred to form fifth regions 236 at two or more locations among the locations opposed to edges 21E, 21F, 21G, which are respectively corresponding to the winding direction, the winding start, and the winding end, and opposed to the connecting location of anode lead 11A, and it is more preferred to form fifth regions 236 at all of the locations.

Next, a configuration shown in FIG. 14 will be described. In this configuration, anode body 21, separator 23, and cathode body 22 are stacked to form a capacitor element. Also in this case, since fifth region 236 is provided at a position opposed to edge 21H of anode body 21, similar effects as those of winding-type capacitor element 12A can be exerted. Note that, also in a stacking-type capacitor element, fifth region 236 may be formed at a position opposed to a location connecting the anode lead.

Note that, in the above description, the description is given by taking an electrolytic capacitor as an example of power storage device 10. However, the present disclosure is not limited to electrolytic capacitors. For example, the present disclosure can be applied to other devices, etc. that use an electrolytic solution and conductive polymers, which are a solid electrolyte, in combination.

EXAMPLES

Hereinafter, specific Examples of the present disclosure will be described. Note that the present disclosure is not limited to these Examples.

Example 1

First, in order to form separators, natural fiber paper was used as a separator base material. Then, dispersion liquid in which fine particles of polyethylenedioxythiophene (containing polystyrensulfonic acid as a dopant) serving as conductive polymers were dispersed in a dispersion medium was used as a liquid agent, and a first region in which the conductive polymers were deposited in a first surface layer of the separator was formed by applying the liquid agent from a first surface side of the separator base material. Note that, in this process, a third region was not formed. If a total deposition amount of conductive polymers with respect to a separator base material in Comparative Example 1 (conventional example), which is described later, is assumed to be 100, the total deposition amount of the conductive polymers deposited on the separator base material in Example 1 was 100 in weight ratio.

Then, as an anode body, aluminum foil on which a dielectric oxide film was formed was prepared. The dielectric oxide film was formed by anodizing treatment after a surface thereof was roughened by etching treatment. As a cathode body, aluminum foil having a surface undergone etching treatment was prepared.

Then, two sheets of the separator described above were prepared. The cathode body, the anode body, and the two sheets of the separator were disposed so that the first surface of the separator on which the conductive polymers were deposited and the anode body were opposed to each other, and a second surface of the separator on which the conductive polymers were not deposited and the cathode body were opposed to each other. Then, a capacitor element was made by winding the cathode body, the anode body, and the two sheets of the separator.

Subsequently, the capacitor element was immersed in an electrolytic solution, which was made by dissolving 1,6-decanedicarboxylic acid ammonium in ethylene glycol, under a reduced pressure condition to impregnate voids of the capacitor element with the electrolytic solution.

After the capacitor element in this state was inserted in an aluminum-made case having a bottomed tubular shape, an opening sealer, which was a molded body of resin vulcanized butyl rubber, was disposed at an opening of the case. The case was sealed by subjecting the opening of the case to curling processing together with the opening sealer.

As a result, an electrolytic capacitor having a rated voltage of 450 V and an electrostatic capacity of 10 μF was made. The electrolytic capacitor has a diameter of 10 mm and has a height of 20 mm.

Next, other Examples and Comparative Examples will be described below. Note that description of the parts similar to those of Example 1 will be omitted.

Example 2

In Example 2, a liquid agent obtained by diluting the liquid agent used in Example 1 by a solvent so that the concentration of the conductive polymers became two-thirds thereof was used. The liquid agent was applied from the first surface side to form a first region in which the conductive polymers were deposited in the first surface layer of the separator and to form a third region in which the conductive polymers were deposited in part of the second surface layer. Therefore, a region other than the third region of the second surface layer is a second region in which the conductive polymers were not deposited. If a total deposition amount of conductive polymers with respect to a separator base material in Comparative Example 1 (conventional example), which is described later, is assumed to be 100, the total deposition amount of the conductive polymers deposited on the separator base material in Example 2 was 100 in weight ratio.

Example 3

In Example 3, by using the liquid agent used in Example 1, the liquid agent in an amount that was 80% of Example 1 in volume was applied from the first surface side to form a first region in which the conductive polymers were deposited in a first surface layer of a separator. Note that an entire second surface layer was a second region in which the conductive polymers were not deposited. Therefore, a third region was not formed. If a total deposition amount of conductive polymers with respect to a separator base material in Comparative Example 1 (conventional example), which is described later, is assumed to be 100, the total deposition amount of the conductive polymers deposited on the separator base material in Example 3 was 80 in weight ratio.

Comparative Example 1

In Comparative Example 1, a liquid agent obtained by diluting the liquid agent used in Example 1 by a solvent to change the concentration of the conductive polymers to two fifth thereof was used. The liquid agent was applied separately from a first surface side of a first separator half body and from a second surface side of a second separator half body to deposit the conductive polymers in an entire area of a separator base material, and regions in which the conductive polymers were deposited were formed in a first surface layer and a second surface layer.

Comparative Example 2

In Comparative Example 2, by using the liquid agent used in Example 1, the liquid agent was applied from a second surface side to form a region in which the conductive polymers were deposited in a second surface layer of a separator. Note that, in this process, no first region was formed. If the total deposition amount of the conductive polymers with respect to the separator base material in Comparative Example 1 (conventional example) is assumed to be 100, the total deposition amount of the conductive polymers deposited on the separator base material in Comparative Example 2 was 100 in weight ratio.

Evaluations

Ten electrolytic capacitors were made in each of Examples 1, 2, 3 and Comparative Examples 1, 2, and they were subjected to ESR measurement. In ESR evaluation, the measurement was carried out at a frequency of 100 kHz in a 20° C. environment. Results thereof are shown in Table 1.

Note that values of ESR and the total deposition amounts of the conductive polymers described in Table 1 are relative values with respect to a case in which the value is 100 in Comparative Example 1.

TABLE 1

| | ESR (relative values, wherein the value is 100 in Comparative Example 1) | Total Deposition Amount of Dielectric Polymers (relative values, wherein the value is 100 in Comparative Example 1) |
| --- | --- | --- |
| Example 1 | 72 | 100 |
| Example 2 | 89 | 100 |
| Example 3 | 90 | 80 |
| Comparative Example 1 (conventional example) | 100 | 100 |
| Comparative Example 2 | 123 | 100 |

According to Example 1 and Example 2, compared with Comparative Examples 1, 2, it can be understood that, even when the conductive polymers in the same amount were deposited on the separator base material, higher effects in reducing ESR were obtained in the case in which many of the conductive polymers were deposited in the first surface layer side serving as the anode body side of the separator base material than in the case in which the conductive polymers were deposited in the entire area of the separator base material.

When Example 2 and Example 3 are compared with each other, by concentrating the conductive polymer deposited region more in the anode body side in Example 3, the effects reducing ESR equivalent to that of Example 2 were obtained with a smaller amount of the conductive polymers that was used. Therefore, manufacturing cost can be also reduced without deteriorating ESR.

According to these results, it is estimated that the effects reducing ESR are higher in the case in which many of the conductive polymers are present in the anode body side having the dielectric oxide film, which has a high film resistance, to bring many of the conductive polymers into contact with the anode body than in the case in which many of the conductive polymers are brought into contact with the cathode body having almost no dielectric oxide film.

According to the present disclosure, power storage devices with low ESR can be obtained. Therefore, the present disclosure can be applied to devices such as electrolytic capacitors that use, in combination, both an electrolytic solution and conductive polymers, which are a solid electrolyte.

What is claimed is:

1. A power storage device comprising a power storage element and an electrolytic solution, the power storage element being impregnated with the electrolytic solution, the power storage element includes:
   an anode body;
   a cathode body opposed to the anode body; and
   a separator having a separator base material and a conductive polymer deposited on the separator base material, the separator being interposed between the anode body and the cathode body;
wherein:
   the separator has
      a first surface layer including a first surface opposed to the anode body and
      a second surface layer including a second surface opposed to the cathode body,
   the first surface layer has a first region in which the conductive polymer is deposited, and
   the second surface layer has a second region in which the conductive polymer is not deposited.

2. The power storage device according to claim 1, wherein:
   the second surface layer has a third region in which the conductive polymer is deposited, and
   an opposed area of the first region in the first surface layer with respect to the anode body is larger than an opposed area of the third region in the second surface layer with respect to the cathode body.

3. The power storage device according to claim 1, wherein:
   the second surface layer has a third region in which the conductive polymer is deposited, and
   an amount of the conductive polymer deposited in a first separator half body is greater than an amount of the conductive polymer deposited in a second separator half body, where a part from a center of the separator in thickness direction to the first surface is defined as the first separator half body, and a part from the center of the separator in thickness direction to the second surface is defined as the second separator half body.

4. The power storage device according to claim 1, wherein:
   the separator base material includes paper or an unwoven fabric each containing an electrically non-conductive fiber, and
   the conductive polymer is deposited on the electrically non-conductive fiber.

5. The power storage device according to claim 4, wherein a density of the electrically non-conductive fiber in the first surface layer is lower than a density of the electrically non-conductive fiber in the second surface layer.

6. The power storage device according to claim 4, wherein a density of the electrically non-conductive fiber in the second surface layer is lower than a density of the electrically non-conductive fiber in the first surface layer.

7. The power storage device according to claim 1, wherein:
   the second surface layer has a third region in which the conductive polymer is deposited,
   the separator has an intermediate layer between the first surface layer and the second surface layer,
   the intermediate layer has a fourth region in which the conductive polymer is deposited, and
   the conductive polymer deposited in the first region of the first surface layer and the conductive polymer deposited in the third region of the second surface layer are electrically connected to each other via the conducive polymer deposited in the fourth region of the intermediate layer.

8. The power storage device according to claim 1, wherein a deposition amount of the conductive polymer, which is deposited on the separator base material on the first surface, per a unit area of the separator base material is greater than a deposition amount of the conductive polymer, which is deposited on the separator base material on the second surface, per the unit area of the separator base material.

9. The power storage device according to claim 1, wherein:
the anode body includes anode foil on which a dielectric film is formed,
the cathode body includes cathode foil, and
the power storage element is a capacitor element having the anode foil and the cathode foil wound with the separator interposed between the anode foil and the cathode foil.

10. The power storage device according to claim 9, wherein:
the first surface layer has a fifth region in which the conductive polymer is not deposited,
the anode body has an anode lead connected to the anode foil, and
the fifth region is provided at a position opposed to a connecting location of the anode foil and the anode lead.

11. The power storage device according to claim 9, wherein:
the first surface layer has a fifth region in which the conductive polymer is not deposited, and
the fifth region is provided at a position opposed to an edge of the anode foil, the edge being along a winding direction.

12. The power storage device according to claim 9, wherein
the first surface layer has a fifth region in which the conductive polymer is not deposited, and
the fifth region is provided at least either one of a position opposed to a winding-start edge of the anode foil and a position opposed to a winding-end edge of the anode foil.

13. The power storage device according to claim 1, wherein:
a dielectric film is formed on a surface of the anode body, and
the power storage element is a capacitor element having the anode body, the separator, and the cathode body stacked.

14. The power storage device according to claim 13, wherein:
the first surface layer has a fifth region in which the conductive polymer is not deposited, and
the fifth region is provided at a position opposed to an edge of the anode body.

15. A method of manufacturing a power storage device, the method comprising:
applying a liquid agent serving as a solution or dispersion liquid of a conductive polymer to a first surface or to a second surface of a separator base material to cause the liquid agent to permeate interior of the separator base material and then vaporizing at least part of a solvent or a dispersion medium contained in the liquid agent to form a separator having the conductive polymer deposited on the separator base material;
causing an anode to be opposed to the first surface of the separator and causing a cathode to be opposed to the second surface of the separator to form a power storage element; and
impregnating the power storage element with an electrolytic solution,
wherein, when the separator is formed, a first region in which the conductive polymer is deposited is formed in a first surface layer including the first surface, and a second region in which the conductive polymer is not deposited is formed in a second surface layer including the second surface.

16. The method of manufacturing the power storage device according to claim 15, wherein an area of an applied region of the liquid agent in the first surface is larger than an area of an applied region of the liquid agent in the second surface.

17. The method of manufacturing the power storage device according to claim 15, wherein, when the separator is formed, the liquid agent is applied to the separator base material by a printing method.

* * * * *